United States Patent
Suzuki et al.

(10) Patent No.: US 6,724,530 B2
(45) Date of Patent: Apr. 20, 2004

(54) POLARIZED LIGHT ILLUMINATOR WITH A POLARIZED LIGHT BEAM SPLITTER

(75) Inventors: Shinji Suzuki, Yokohama (JP); Shinichi Umemoto, Hachiozi (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/011,429

(22) Filed: Dec. 11, 2001

(65) Prior Publication Data

US 2002/0080485 A1 Jun. 27, 2002

(30) Foreign Application Priority Data

Dec. 12, 2000 (JP) .................................. 2000-377170

(51) Int. Cl.$^7$ .............................. G02B 27/28; F21V 9/14
(52) U.S. Cl. .................. 359/487; 359/483; 359/485; 359/619; 362/19
(58) Field of Search .................. 349/123, 124; 359/352, 487, 483, 485; 362/19; 353/20, 38

(56) References Cited

U.S. PATENT DOCUMENTS

| | | | |
|---|---|---|---|
| 2,748,659 A | * | 6/1956 | Geffcken et al. |
| 2,821,114 A | * | 1/1958 | Wiemer et al. |
| 5,566,367 A | * | 10/1996 | Mitsutake et al. ........... 359/485 |
| 6,092,901 A | * | 7/2000 | Hashizume et al. .......... 362/19 |
| 6,109,752 A | * | 8/2000 | Itoh et al. ...................... 353/98 |
| 6,144,492 A | * | 11/2000 | Iwamura et al. ............. 359/487 |
| 6,147,802 A | * | 11/2000 | Itoh et al. ..................... 359/500 |
| 6,219,112 B1 | * | 4/2001 | Yoneyama et al. ............ 349/5 |
| 6,292,296 B1 | * | 9/2001 | Choi et al. ................... 359/487 |
| 6,513,953 B1 | * | 2/2003 | Itoh ............................ 362/331 |

FOREIGN PATENT DOCUMENTS

| | | |
|---|---|---|
| EP | 0 913 720 A2 | 5/1999 |
| EP | 1 020 739 A2 * | 7/2000 |
| EP | 1 102 093 A1 | 5/2001 |
| JP | 08-334616 | 1/1997 |
| JP | 09-005518 | 1/1997 |
| JP | 10-142408 | 5/1998 |
| WO | WO 00/73824 A1 * | 12/2000 |

* cited by examiner

*Primary Examiner*—John Juba
(74) *Attorney, Agent, or Firm*—Nixon Peabody LLP; David S. Safran

(57) ABSTRACT

To reduce the size of a polarizing device used for a polarized light illuminator, to cut the costs of the polarizing device and to reduce the size of the entire polarized light illuminator, light from a lamp which is incident on a polarizing device, is subjected to polarization separation, and is then incident on an integrator lens. The polarized light emerging from the integrator lens is converted into parallel light via an aperture and a second planar mirror by means of a collimator and is emitted onto a workpiece. As the polarizing element, a polarizing element formed by a combination of several polarized light beam splitters is used, and it is arranged such that the shadow is projected by the boundary surfaces of the polarized light beam splitters onto the boundary lines of the lenses which form the integrator lens. In this way, the reduction in illuminance and the deterioration of the distribution of the illuminance on the irradiation surface can be prevented. Furthermore, the polarizing device can be placed on the outlet side of the integrator lens and the boundary surfaces of the polarized light beam splitters can be placed in the areas in which the illuminance is reduced by the shadow of the light which strikes the boundary surfaces of the individual lenses of the integrator lens.

9 Claims, 7 Drawing Sheets areas in which the illuminance decreases due to the boundary surfaces of the integrator lens glass plate

POLARIZED LIGHT ILLUMINATOR WITH A POLARIZED LIGHT BEAM SPLITTER

BACKGROUND OF THE INVENTION

1. Field of the Invention

The invention relates to a polarized light illuminator in which an alignment layer of a liquid crystal cell element and a wide view film which is built into the liquid crystal cell are irradiated with polarized light.

2. Description of the Prior Art

A liquid crystal cell element is produced as follows:

An alignment layer formed on the surface of a transparent substrate is treated to align the liquid crystals in the desired direction (alignment treatment).

Two of these transparent substrates are cemented to one another such that the alignment layers are located on the inside and a gap with a stipulated distance between the two substrates is maintained.

Liquid crystals are injected into this gap.

For the above described alignment treatment of the alignment layer of a liquid crystal cell element, there is a technique which is called "optical alignment". Here, an alignment layer is irradiated with polarized light and exposed.

A polarized light illuminator is disclosed, for example, in Japanese patent specification 2928226 and Japanese patent specification 2960392 (both corresponding to published European Patent Application EP 0 913 720 A2 and U.S. Pat. No. 6,190,016).

Recently, the polarized light illuminator has been used more and more often for optical alignment of a wide view film, besides for producing a liquid crystal cell element. A wide view film is produced as follows:

Liquid crystals which can be UV-hardened are applied to the base film.

Liquid crystal molecules are located (aligned) in a certain direction.

Afterwards the liquid crystals are hardened by UV irradiation so that the direction of the liquid crystal molecules is consolidated.

The reduction in image quality can be equalized by cementing a wide view film onto the liquid crystal cell.

The above described alignment process of the "arrangement of liquid crystal molecules in a certain direction" was conventionally done by rubbing. But recently, more and more often, it is done using the above described illuminator and by optical alignment.

It is necessary for the polarizing device which is used for the above described illuminator to have resistance to heat and strong light. As one such polarizing device, several glass plates are tilted with respect to the optical axis by the Brewster angle and located parallel to one another with distances (hereinafter called a "pile polarization plate").

In the aforementioned Japanese patent specifications 2928226 and 2960392, an arrangement is shown in which a pile polarization plate is located in the vicinity of an integrator lens. When the polarizing device is located in the vicinity of an integrator lens, a reduction in size can be achieved more easily than in an arrangement of a polarizing device between the collimator (or a collimator mirror) and a workpiece because the light beam is small in the vicinity of the integrator lens.

However, in the pile polarization plate, it is necessary to increase the number of glass plates which are to be arranged parallel to one another in order to obtain the extinction ratio necessary for alignment of the above described alignment layer. This results in the disadvantages that the costs of the polarizing device increase, that moreover the length of the optical path increases, as is shown in FIG. 9, and that the entire device becomes large.

SUMMARY OF THE INVENTION

The invention was devised to eliminate the above described disadvantages of the prior art. As a result, primary objects of the present invention are to reduce the size of a polarizing device used for a polarized light illuminator, to cut the costs of the polarizing device and to reduce the size of the entire polarized light illuminator.

A polarized light beam splitter can be imagined as a polarizing device which has resistance to heat and strong light. A polarized light beam splitter is produced by vacuum evaporation of an inorganic, dielectric, multi-layer film (which serves as a polarization separating film) onto the inclined surface of a right-angled prism, and by cementing the inclined surfaces of two right-angle prisms to one another.

The unpolarized light incident in the polarized light beam splitter is separated into P-polarized and S-polarized light by the inorganic, dielectric, multi-layer film. The P-polarized light propagates in a straight line and is transmitted by the beam splitter. The S-polarized light is reflected. Since the prism is made of quartz glass, it is resistant to heat and strong light.

Since the inorganic, dielectric, multi-layer film which is a polarization separation film made of an inorganic material, it has resistance to heat and strong light. Furthermore, an inorganic, dielectric, multi-layer film can be produced which, at a predetermined wavelength, has a good polarization separation characteristic (which has a good extinction ratio, for example, a small portion of the S-polarized light in the transmitted polarized P-polarized light).

On the other hand, according to the enlargement of the surface of the liquid crystal cell element, the irradiation area becomes larger, by which the device becomes larger and also a large polarizing device is needed. The size of the prisms comprising the polarized light beam splitter is, however, limited for reasons of production, such as due to the size of the vacuum evaporation device which forms the vacuum evaporated film. Furthermore, the costs of the quartz prism become very high when the prism becomes large.

Therefore, a polarizing device is formed by combination of several of these polarized light beam splitters with one another. Thus, combining small prisms yields a large polarizing device. In this way, for example, an application for optical alignment of a large liquid crystal cell element is enabled and the costs can also be reduced. Furthermore, since the length of the polarizing device can be reduced in the direction of the optical axis, the illuminator can be made smaller.

However, if light is incident in a polarizing device which has been formed by combination of several polarized light beam splitters, a shadow forms in the areas of the boundary surfaces of the polarized light beam splitters. When this shadow is projected unchanged onto the irradiation surface, the illuminance is reduced and the distribution of the illuminance on the irradiation surface is degraded.

The objects of the invention are achieved as follows:

(1) In the case of an arrangement of a polarizing device which has been formed by combination of several polarized light beam splitters, on the incidence side of an integrator lens:

The polarized light beam splitters are arranged such that the shadow formed by the areas of the boundary surfaces of the polarized light beam splitters is projected onto the boundary lines between several combined lenses of the integrator lens.

The boundary surfaces between the respective lenses of the integrator lens are shadowy due to light irradiation. However, these shadows are projected onto the outer side of the irradiation area. Therefore, when the shadow of the boundary surfaces of the polarized light beam splitters is projected onto the boundary lines between the respective lens of the integrator lens, the shadows are prevented from being projected onto the irradiation surface by the boundary surfaces of the polarized light beam splitters.

In this way, the reduction in illuminance and the deterioration of the distribution of the illuminance on the irradiation surface by the shadow of the surfaces on which the polarized light beam splitters are combined with one another, i.e., the boundary surfaces, can be prevented.

2) In the case of an arrangement of a polarizing device which has been formed by combination of several polarized light beam splitters, on the outlet side of an integrator lens:

When light is incident on the integrator lens, the illuminance of the light which emerges from the outer peripheral edge area on the respective outlet side of the respective lens of the several lenses which form the integrator lens is reduced more than the illuminance of the light which emerges from the middle area. However, since the light emerging from the integrator lens broadens, on the light irradiation surface, the above described areas in which the illuminance decreases are projected onto the outside of the irradiation area.

Therefore, in the outer peripheral edge area of the respective lens of the above described integrator lens, i.e., in the areas in which the illuminance of the light which emerges from the boundary surfaces of the respective lenses is reduced, there are the boundary surfaces of the polarized light beam splitters.

However, since the light emerges broadened from the integrator lens and the above described areas in which the illuminance is reduced broaden, it is necessary to determine the locations at which the boundary surfaces of the polarized light beam splitters are located according to this broadening.

This can prevent the boundary surfaces of the polarized light beam splitters from being projected onto the irradiation surface. In this way the reduction of illuminance and the deterioration of the distribution of the illuminance on the irradiation surface can be prevented.

(3) The prisms comprising the polarized light beam splitters are joined to one another with "optical contact". An adhesive or a sealant is applied to the vicinity of the joining surfaces.

Usually, an adhesive or sealant is used to cement the inclined surfaces of two right-angled prisms to one another. However, currently, commercial adhesives or sealants absorb UV light and are damaged over time when they are irradiated with UV light with the wavelength which is used for optical alignment (currently with respect to the material for the alignment layer, often with a wavelength from 200 nm to 340 nm). In this way, the transmittance of the UV light is reduced. Therefore, to cement the polarized light beam splitters, an "optical contact" is used, and thus, joining takes place, but "optical contact" is easily lost by the influences of temperature changes and humidity. In a polarized light illuminator, it is necessary to keep the properties, such as the extinction ratio of the emitted polarized light and the like, stable over a long time. When the adhesive surfaces of the polarized light beam splitters become loose, the polarization characteristic decreases. Therefore, an adhesive or sealant is applied to the vicinity of the cemented surfaces and the humidity is prevented from being absorbed by the inner sides of the adhesive surfaces. Thus, the connection strength is maintained.

The invention is explained in detail below using several embodiments shown in the accompanying drawings.

DETAILED DESCRIPTION OF THE PREFERRED EMBODIMENT

Figure 1:
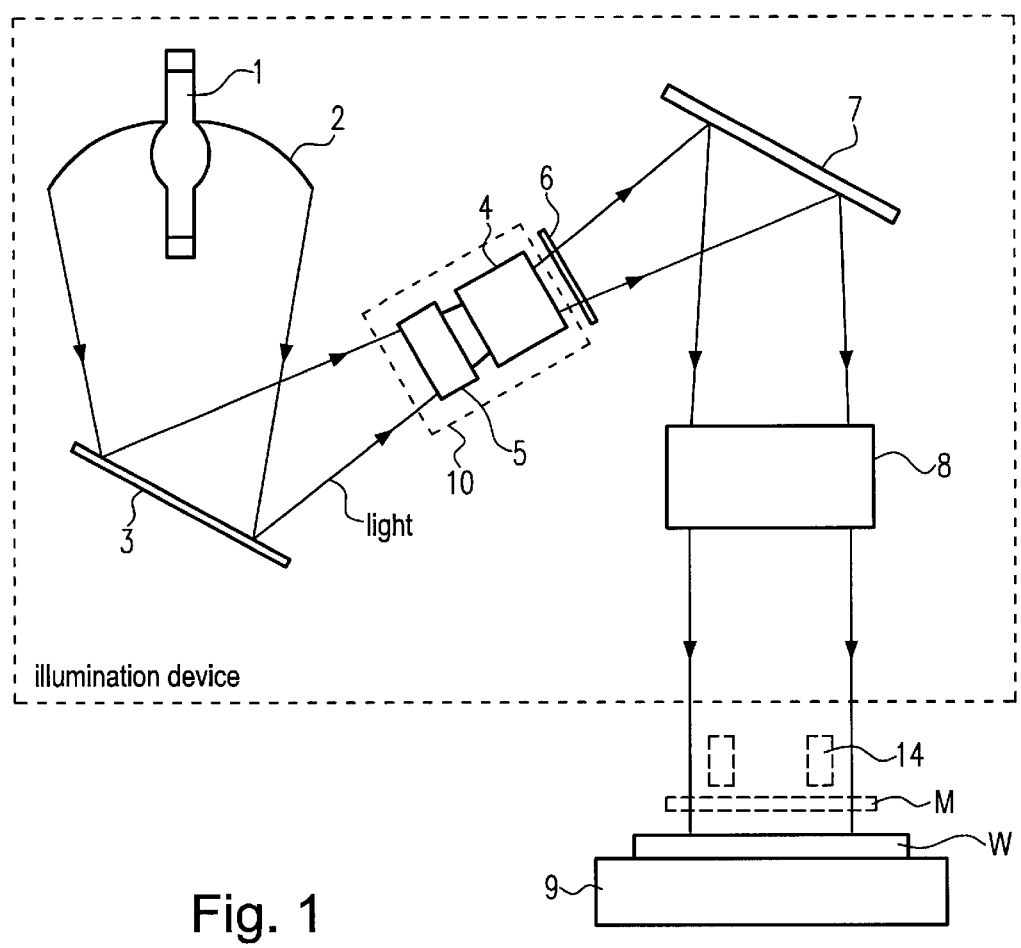
FIG. 1 is a schematic representation of the entire arrangement of an embodiment of a polarized light illuminator in accordance with the invention.

FIG. 1 shows the overall arrangement of an embodiment of a polarized light illuminator in accordance with the invention. In the figure, the light which is emitted from a lamp 1 and which contains UV radiation is focused by an oval focusing mirror 2, reflected by a first planar mirror 3 and is incident on an optical unit 10 comprised of a polarizing device 5 and an integrator lens 4. The polarizing device 5 is formed by combination of several polarized light beam splitters, as was described above. In the FIG. 1 arrangement, there is the integrator lens 4 in which on the outlet side of the polarizing device 5, as is described below.

The polarizing device 5 transmits the P-polarized light and reflects most of the S-polarized light. Therefore, the light which is incident on the integrator lens 4 becomes mostly P-polarized light which is passed through an aperture 6 and reflected by means of a second planar mirror 7, converted into parallel light by means of a collimator 8 and emitted onto a workpiece W, such as a substrate or the like which has been placed on the workpiece carrier 9.

In the case of exposure by the multi domain method, there are a mask M and an alignment microscope 14, as is shown by the broken lines in FIG. 1 (the multi domain method is described, for example, in the above described Japanese patent specification 2960392 and other publications).

One specific example of the arrangement of the optical unit 10 is described below; it comprises the above described integrator lens 4 and the above described polarizing device 5.

(1) 1st embodiment (embodiment in which the polarizing device 5 is located on the light incidence side of the integrator lens 4).

Figure 2:
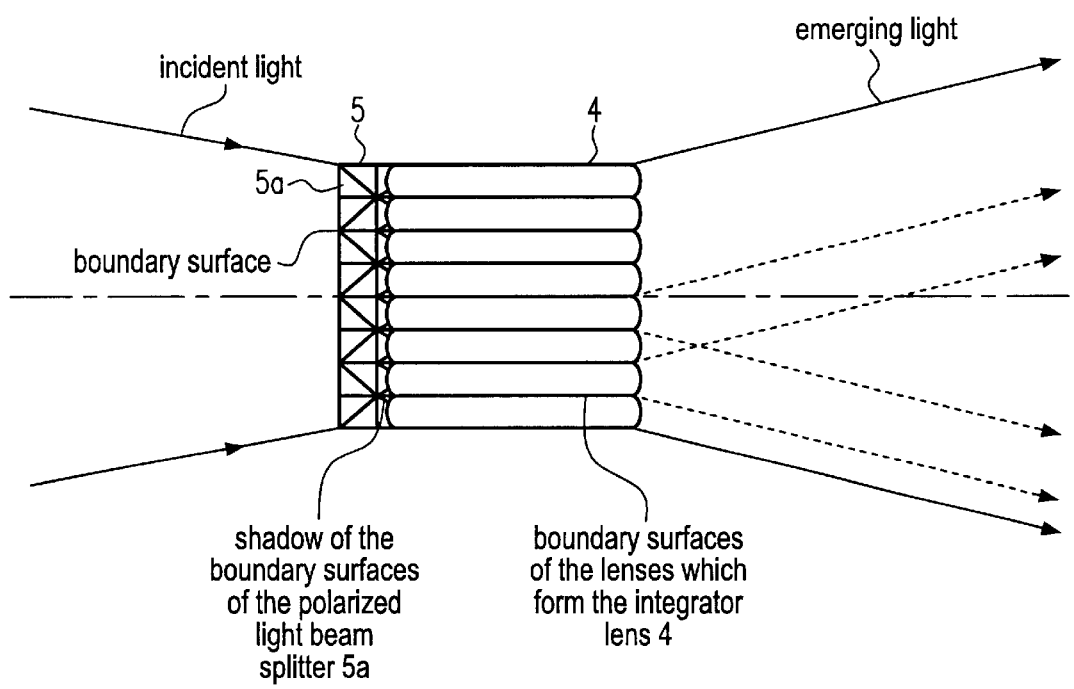
FIG. 2 schematically depicts an embodiment in which there is a polarizing device on the light incidence side of the integrator lens.

FIG. 2 shows an embodiment in which the polarizing device 5 is located on the light incidence side of the integrator lens 4. In FIG. 2, the light is incident from a light source on the polarizing device 5 which is formed of several polarized light beam splitters 5a, is subjected to polarization separation and is incident on the integrator lens 4. The polarized light emerging from the integrator lens 4 is emitted via an optical element, such as a reflector or the like, onto the irradiation surface, as was described above. Since the polarizing device 5 is formed by a combination of several polarized light beam splitters 5a, in the areas of the combination surfaces (boundary surfaces) of the several polarized light beam splitters 5a, a shadow which is projected onto the irradiation surface is formed when the combination surfaces of the several polarized light beam splitters 5a are irradiated with light. In this way, a reduction in the illuminance and a deterioration of the distribution of the illuminance are caused.

Figure 3:
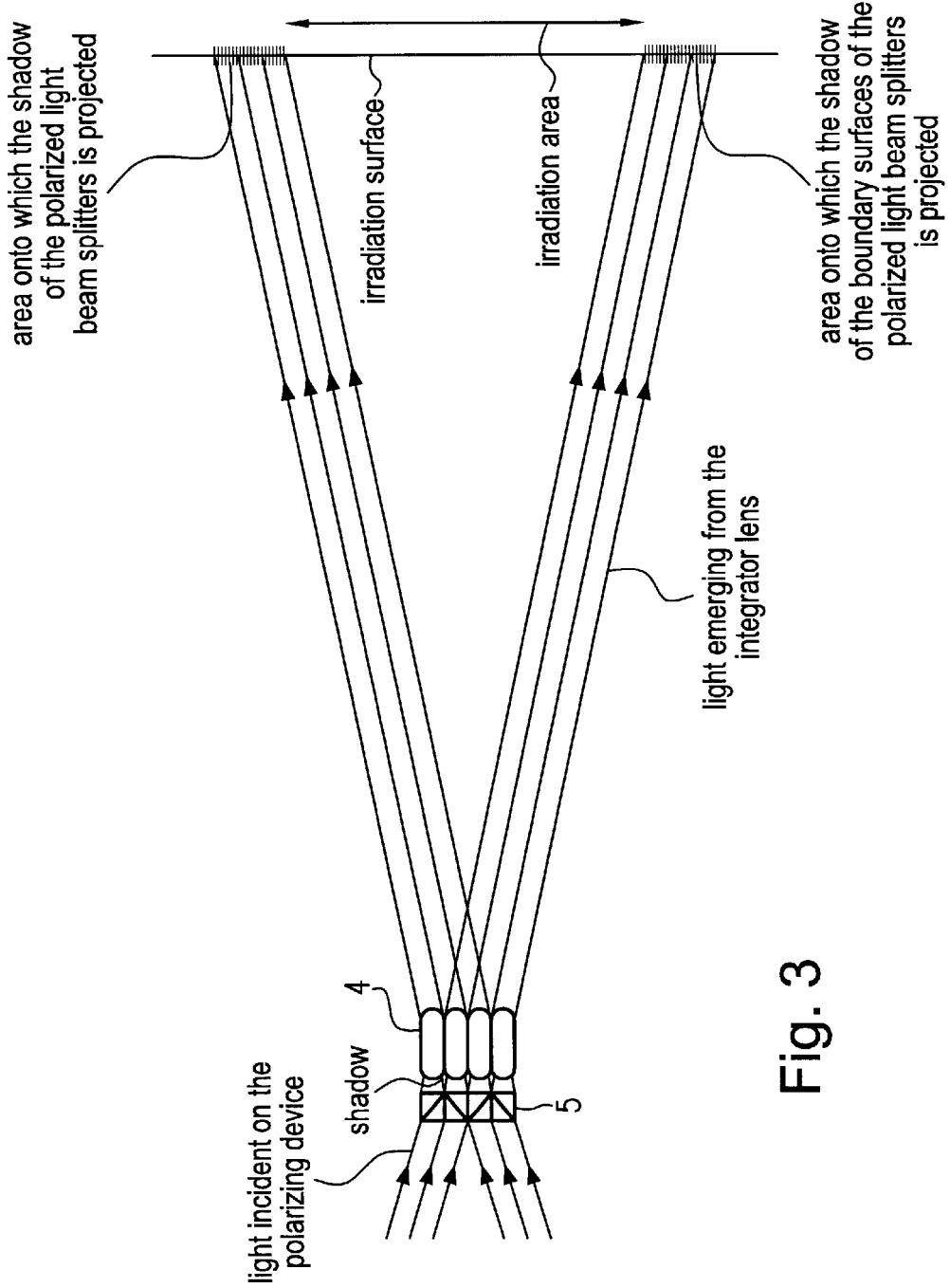
FIG. 3 is a schematic representation of the action of the integrator lens.

Therefore, an arrangement is undertaken in which the shadow of the boundary surfaces of several polarized light beam splitters 5a is projected onto the boundary lines of the several lenses which form the integrator lens 4, as is shown in FIG. 2. The boundary surfaces of the respective lenses of the integrator lens 4 become shadowy due to light irradiation. The shadow by the boundary surfaces of several polarized light beam splitters 5a is, however, as shown in FIG. 3, projected as a result of the action of the integrator lens 4 onto the outside of the irradiation area. The above described arrangement thus prevents the boundary lines between the polarized light beam splitters 5a from being projected onto the irradiation surface, as shown in FIG. 3. Therefore, a decrease in illuminance and deterioration of the distribution of illuminance can be prevented.

In FIG. 2, the polarizing device 5 and the integrator lens 4 are shown arranged at a distance from one another to show the shadow of the boundary surfaces of the polarized light beam splitters 5a. However, if the two are brought into contact with one another, the shadow of the boundary surfaces of the polarized light beam splitters 5a is projected onto the boundary surfaces of the integrator lens 4 without broadening. Thus, on the irradiation surface, the areas in which the illuminance is reduced becomes smaller.

In the above described polarized light beam splitter 5a, two prisms are connected to one another via a vacuum evaporated film. Since degradation by UV light occurs when an adhesive is applied to the joining surface, as was described above, they are joined to one another with "optical contact". "Optical contact" is described, for example, in Japanese patent disclosure document HEI 9-5518 and Japanese patent disclosure document HEI 10-142408.

Figure 4:
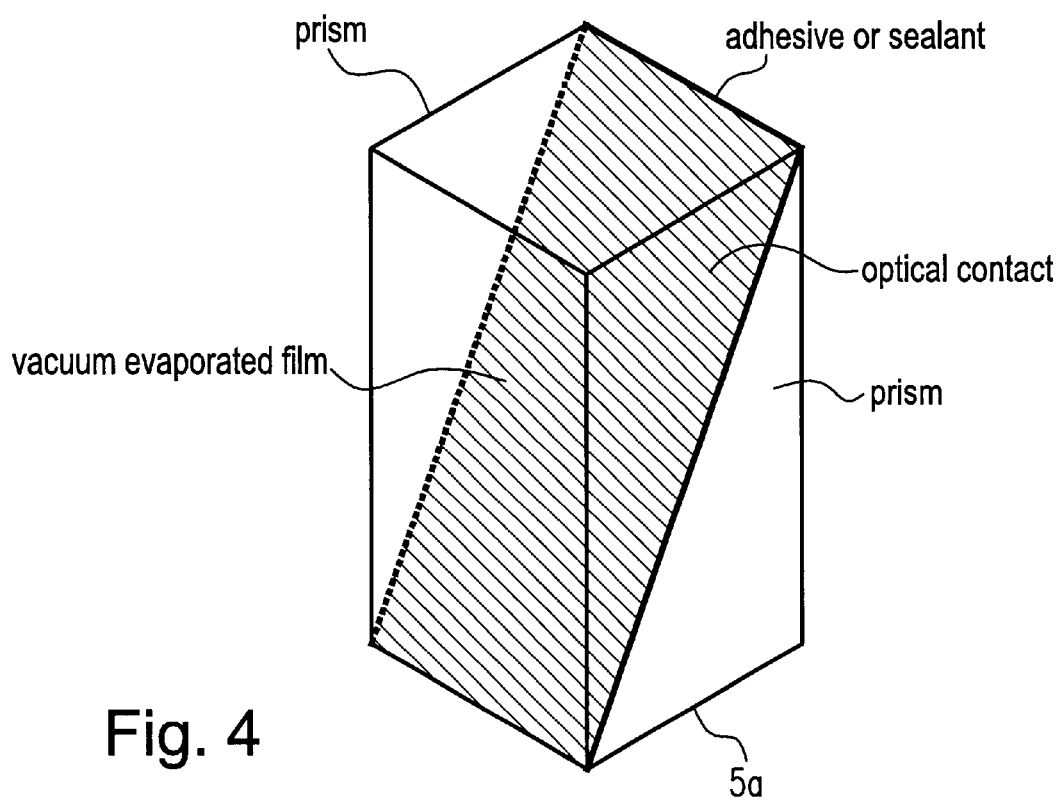
FIG. 4 schematically represents cementing of the prisms of a polarized light beam splitter.

However, "optical contact" is easily lost, as is described, for example, in Japanese patent disclosure document HEI 8-334616 by effects such as temperature changes and moisture. Therefore, an adhesive or sealant is applied to the entire peripheral surface of the joining surface, as shown in FIG. 4. This can prevent moisture from penetrating into the joining surface and the joining of the prisms from being degraded. Although the adhesive or the sealant are degraded by the emitted UV light, a change of the illuminance on the irradiation surface is prevented even when the transmission factor of the UV light changes, because this area is projected as a shadow outside of the irradiation area, as was described above.

Figure 5A:
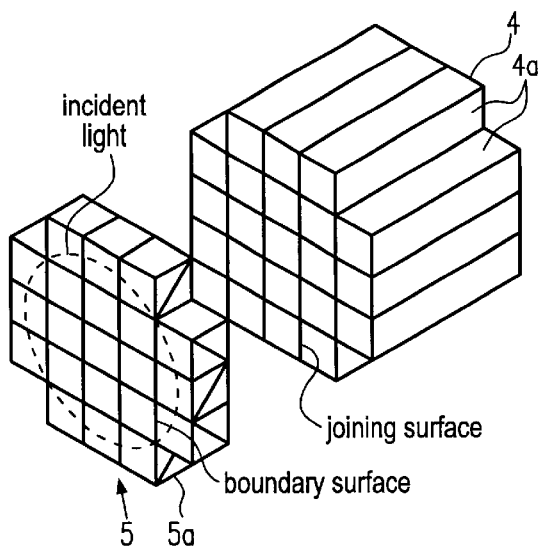
FIGS. 5(a) & 5(b) each show a schematic of an embodiment in which the integrator lens and the polarized light beam splitter are combined with one another.
Figure 5B:
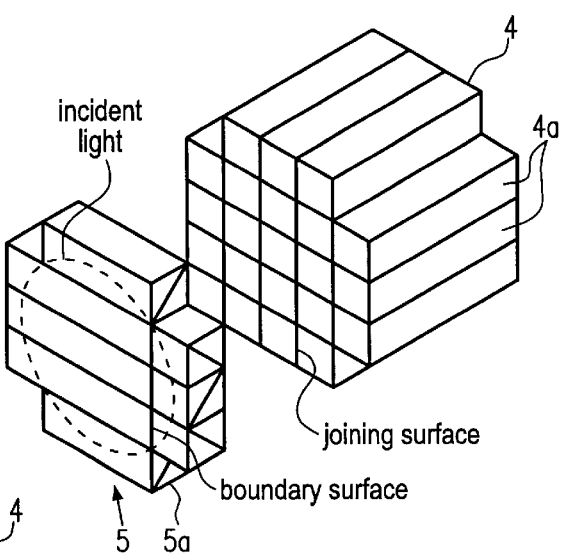
Figure 6:
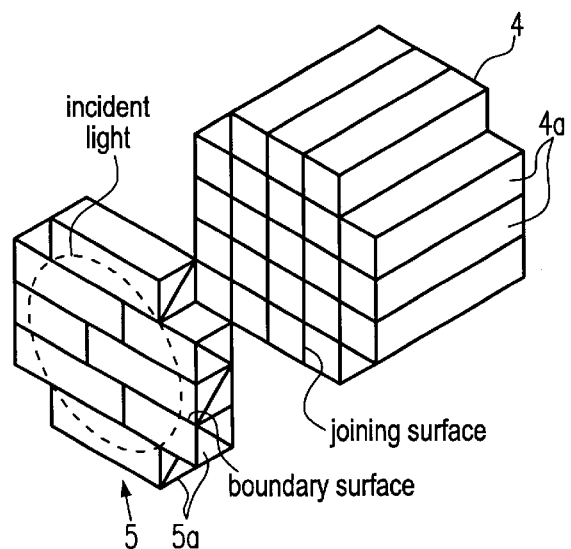
FIG. 6 shows a schematic of a sample arrangement in which the integrator lens and the polarized light beam splitter are combined with one another.

The size and the arrangement of the individual polarized light beam splitter can also be matched to the size and arrangement of the respective lenses 4a which form the integrator lens 4, as shown in FIG. 5(a). In addition, as shown in FIG. 5(b), using rod-shaped polarized light beam splitters 5a, their boundary surfaces can be positioned in the shadow areas of the boundary surfaces of the lens group 4a on the light incidence side. In addition, as shown in FIG. 6, several polarized light beam splitters 5a with suitable sizes can be combined with one another. In this case, if the irradiation area is rectangular, the shape of the individual lenses 4a comprising the integrator lens 4 can be made rectangular and thus a rectangular polarized light beam splitter can be used. This also applies to the following embodiments.

Since, in the above described embodiment, a polarizing device 5 is used which was formed by combining several polarized light beam splitters 5a, the size of the prisms of the individual polarized light beam splitter can be reduced and can be suitably adjusted to the device for irradiating large surfaces, and moreover, the production costs can be reduced. Furthermore, the length of the polarizing device in the direction of the optical axis can be reduced and therefore the illuminator can be made smaller.

The arrangement in which the shadow of the boundary surfaces of several polarized light beam splitters 5a is projected onto the boundary lines between the several lenses 4a which form the integrator lens 4 prevents the shadow of the boundary lines of the polarized light beam splitters 5a from being projected onto the irradiation surface. Thus, the decrease in illuminance and the deterioration of the distribution of the illuminance can be prevented.

(2) 2nd embodiment (embodiment in which an optical element is located on the light incidence side of the polarizing device).

As described in Japanese patent specification 2960392, the proportion of unpolarized light in the outer peripheral area of the irradiation area is increased or the illuminance of the polarized light is reduced when scattered light (nonparallel light) is incident in the polarizing device, because the angle of incidence in the middle area of the polarizing device differs from the angle of incidence of the light in its outer peripheral area. Therefore, it is desirable to place an optical element (a convex lens) on the light incidence side and to allow the light to be incident in the polarizing device and the integrator lens, for which optical path lines between the center of the opening of the oval focusing mirror as the light source and the center of the integrator lens 4a (hereinafter called only "optical path lines") run parallel to one another. An embodiment is shown in FIG. 7 in which the above described optical element is located on the incidence side of the polarizing device.

Figure 7:
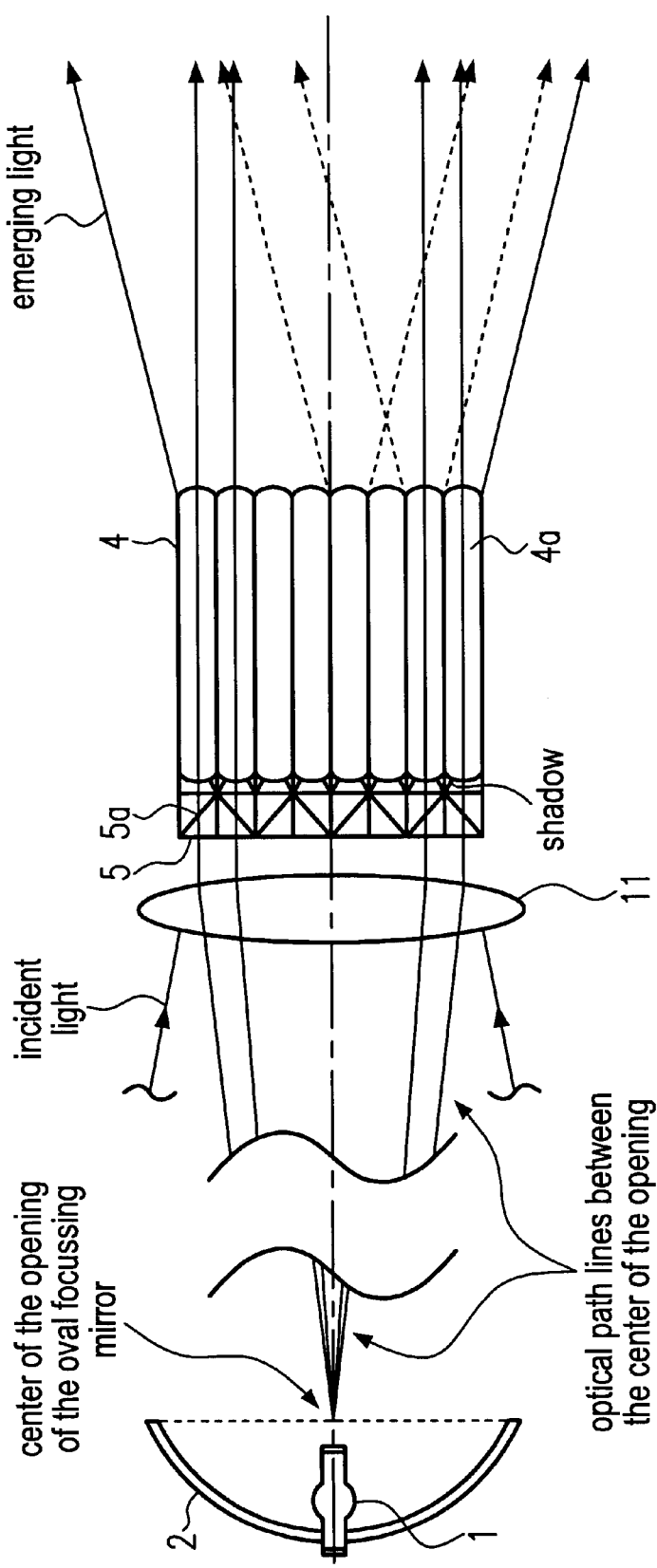
FIG. 7 shows a schematic of an embodiment in which there is an optical element (a convex lens) on the incidence side of the polarizing device.

In FIG. 7, for the optical path lines from the light source (not shown in the drawings) by means of an input lens 11 (convex lens) located on the light incidence side the respective optical path lines are made parallel to one another and they are incident on the respective center of the respective lenses 4a comprising the integrator lens 4. The optical path lines are incident on the polarizing device 5 which is composed of several polarized light beam splitters 5a and are subjected to polarization separation. The polarized light from the polarizing device 5 is incident in the integrator lens 4. The polarized light emerging from the integrator lens 4 is emitted via an optical element, such as a reflector or the like, onto the irradiation surface, as was described above.

As in the first embodiment, the polarized light beam splitters 5a are produced according to the shape and size of the individual lenses comprising the integrator lens 4, and are located next to one another according to the arrangement of the above described individual lenses. If parallel light is allowed to be incident on the polarizing device 5 (this means that, in this case, the optical path lengths run parallel to one another), the shadow can be projected by the boundary surfaces of the polarized light beam splitters 5a onto the boundary surfaces of the integrator lens 4 in a more suitable manner.

By the arrangement of the above described input lens 11, the optical path lines can be allowed to be incident on the polarizing device 5 in parallel, and thus, the shadow can be suitably projected by the boundary surfaces of the polarized light beam splitters 5a onto the boundary surfaces of the integrator lens 4 in a suitable manner. Furthermore, the disadvantages that the proportion of unpolarized light in the outer peripheral area of the irradiation area increases and that the illuminance of the polarized light is reduced can be eliminated.

(3) 3rd embodiment (embodiment in which the polarizing device is located on the outlet side of the integrator lens)

The polarizing device can also be located on the outlet side of the integrator lens. In this case it is advantageous, as described in the above described Japanese patent specification 2960392, to place a pre-stage lens (convex lens) which converts the incident light into parallel light on the outlet side of the integrator lens, and moreover, a post-stage lens (concave lens) which converts the parallel light emerging from the pre-stage lens into nonparallel scattered light, and the polarizing device in the optical path between the pre-stage lens and the post-stage lens.

Figure 8:
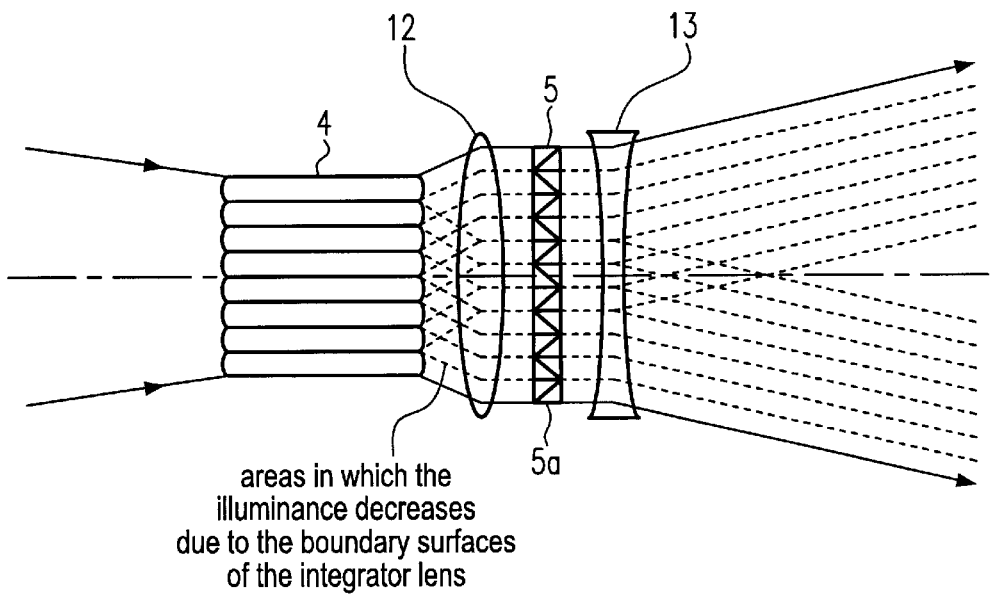
FIG. 8 is a schematic representation of an embodiment in which there is a polarizing device on the outlet side of an integrator lens.
Figure 9:
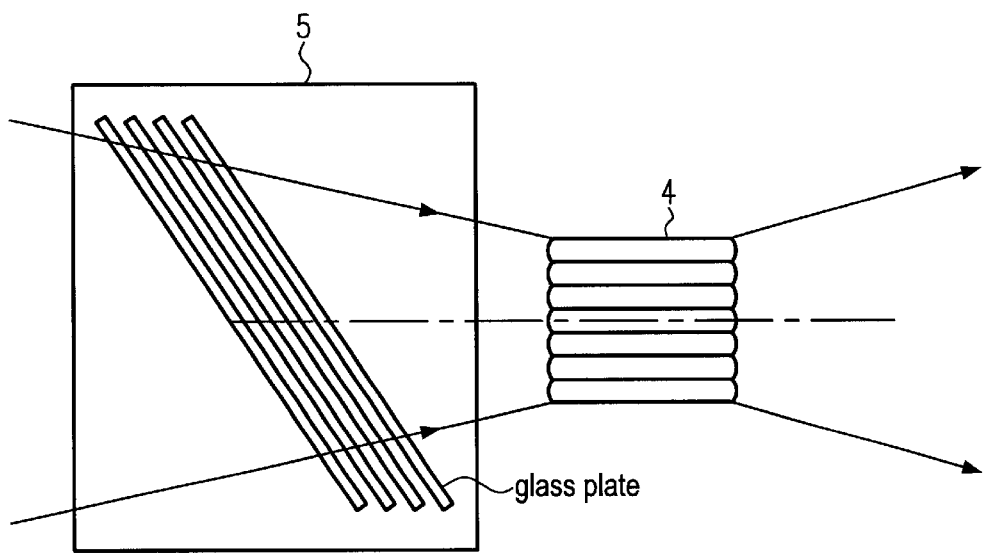
FIG. 9 schematically depicts a conventional example in which a pile polarization plate is used as the polarizing device.

FIG. 8 shows an embodiment in which the polarizing device is on the outlet side of the integrator lens. In FIG. 8, the light from the light source (not shown in the drawings) is incident on the integrator lens 4. In the light emerging from the integrator lens 4, by means of a pre-stage lens (convex lens) 12, the respective optical path lines are made parallel to one another and are incident on the middle of the respective polarized light beam splitters 5a comprising the polarizing device 5. They are incident on the polarizing device 5, that is formed of several polarized light beam splitters 5a, and are subjected to polarization separation. Furthermore, the polarized light from the polarizing device 5 is incident on the post-stage lens 13, is converted into nonparallel scattered light, and emitted via an optical element, such as a reflector or the like, onto the irradiation surface, as described above.

As described above, the illuminance of the light which emerges from the outer peripheral edge area on the respective outlet side of the respective lens of the several lenses which form the integrator lens is reduced more than the illuminance of the light which emerges from the middle area, when light is incident on the integrator lens. However, the areas in which the illuminance has been reduced are projected onto the outside of the irradiation area.

Therefore, in this embodiment, the polarized light beam splitters 5a are arranged such that the boundary surfaces of the polarized light beam splitters 5a are positioned in the areas in which the illuminance decreases, that is, the outer peripheral edge areas of the several lenses which form the integrator lens 4 (of the boundary surfaces between the respective lenses). In this way, as was described using FIG. 3, the shadow areas of the boundary surfaces of the polarized light beam splitters 5a are prevented from being projected onto the irradiation area.

It is adequate if the boundary surfaces of the polarized light beam splitters are positioned in the shadow areas of the integrator lens. The size and the arrangement of the individual polarized light beam splitter can also be matched to the size and arrangement of the individual lenses 4a which form the integrator lens, as shown in above in FIGS. 5(a), 5(b) & 6. However, an arrangement using rod-shaped polarized light beam splitters can be undertaken or several polarized light beam splitters with suitable sizes can be combined with one another.

However, the light emerging from the integrator lens 4 is scattered light, as is shown in FIG. 8, and it broadens during incidence on the pre-stage lens 12 according to the distance between the two. The areas of the outer peripheral edge areas of the several lenses 4a, which form the integrator lens 4 and in which the illuminance decreases, therefore reach a point which is broadened with respect to the optical axis. The size of the individual polarized light beam splitter 5a which is located downstream of the pre-stage lens 12 must therefore be matched to the broadening of the light emerging from the integrator lens 4 so that the areas of the outer peripheral edge areas of the above described several lenses in which the illuminance decreases and the boundary surfaces of the polarized light beam splitters 5a agree with one another, and thus, the shadow of the boundary surfaces of the polarized light beam splitters 5a is not projected onto the irradiation area.

The individual polarized light beam splitters 5a are, as described in the first embodiment, joined to one another with "optical contact" and the entire periphery of the joining surfaces is covered with an adhesive or sealant. Since the boundary surface areas of the polarized light beam splitters 5a to which the adhesive or sealant is applied are located in the areas in which the illuminance of the light emerging from the integrator lens 4 decreases, the adhesive or sealant is degraded. If it is assumed that the adhesive or sealant is degraded by scattered light or the like, there is no effect on the illuminance of the irradiation surface because this area is an area which is projected to outside the irradiation area.

Action of the Invention

As was described above, the following effects can be obtained in accordance with the invention:

(1) By the measure that in a polarized light illuminator, as the polarizing device a polarized light beam splitter is used which is formed by the combination of several polarized light beam splitters, the size of the prisms of the polarized light beam splitter can be reduced and the costs cut. Furthermore, a large polarizing device can be easily produced. In addition, the size of the entire polarized light illuminator can be reduced because the length of the polarizing device in the direction of the optical axis is prevented from increasing.

(2) In the case of an arrangement of the polarizing device on the incidence side of the integrator, the polarized light beam splitters are arranged combined with one another such that the shadow of the boundary surfaces of the polarized light beam splitters is projected onto the boundary lines between the individual lenses of the integrator lens. Therefore, the boundary surfaces of the individual polarized light beam splitters are prevented from being projected as shadows onto the irradiation surface.

(3) In the case of an arrangement of the polarizing device on the outlet side of the integrator, the polarized light beam splitters are arranged combined with one another such that the boundary surfaces of the polarized light beam splitters are located in the areas in which the illuminance is reduced by the boundary surfaces between the individual lenses of the integrator lens. Therefore, the boundary surfaces of the individual polarized light beam splitters are prevented from being projected as shadows onto the irradiation surface.

(4) Since the polarized light beam splitters are joined to one another with "optical contact", the decrease of the UV light transmittance which occurs due to damage to the adhesive or sealant can be prevented. Furthermore, the measure that the peripheral area of the adhesive surfaces which have been joined to one another with "optical contact" is covered by an adhesive or sealant prevents the adhesive surfaces from absorbing moisture. In this way the joining strength can be preserved.

What is claimed is:

1. Polarized light illuminator comprising:

a polarizing device in which light is polarized;

an integrator lens comprised of several lenses positioned to receive light polarized by the polarizing device; and an optical alignment layer positioned to receive polarized light emerging from the integrator lens;

wherein said polarizing device is formed of a combination of several polarized light beam splitters in which prisms are joined to one another via a vacuum evaporated film, and wherein the polarized light beam splitters are formed and arranged relative to the lenses of the integrator lens such that shadows formed by irradiation of boundary surfaces of the combined polarized light beam splitters by light incident on the polarizing device are projected onto boundary lines of the several lenses of the integrator lens.

2. Polarized light illuminator as claimed in claim 1, further comprising a convex lens on a light incidence side of the polarizing device for converting light incident on the polarizing device into parallel light.

3. Polarized light illuminator as claimed in claim 1, wherein the polarized light beam splitters are joined to one another by "optical contact" and an adhesive or a sealant is applied to a periphery of joining surfaces of the prisms.

4. Polarized light illuminator comprising:

an integrator lens comprised of several lenses;

a polarizing device in which light is polarized positioned to receive light emerging from the integrator lens; and optical alignment layer positioned to receive polarized light from the polarizing device;

wherein the polarizing device is formed by a combination of several polarized light beam splitters in which prisms are joined to one another via a vacuum evaporated film, and wherein the polarized light beam splitters are formed and arranged relative to the integrator lens, according to a broadening of light emerging from the integrator lens, such that the boundary surfaces of the combined polarized light beam splitters are located in areas of reduced illuminance where light, emitted onto the boundary surfaces of the several lenses which form the integrator lens, is projected.

5. Polarized light illuminator as claimed in claim 4, further comprising a convex lens on a light incidence side of the polarizing device for converting light incident on the polarizing device into parallel light.

6. Polarized light illuminator as claimed in claim 5, further comprising a concave lens on a light outlet side of the polarizing device for converting light emerging from the polarizing device into nonparallel divergent light.

7. Polarized light illuminator as claimed in claim 6, wherein the polarized light beam splitters are joined to one another by "optical contact" and an adhesive or a sealant is applied to a periphery of joining surfaces of the prisms.

8. Polarized light illuminator as claimed in claim 5, wherein the polarized light beam splitters are joined to one another by "optical contact" and an adhesive or a sealant is applied to a periphery of joining surfaces of the prisms.

9. Polarized light illuminator as claimed in claim 4, wherein the polarized light beam splitters are joined to one another by "optical contact" and an adhesive or a sealant is applied to a periphery of joining surfaces of the prisms.

* * * * *